Patented Feb. 24, 1953

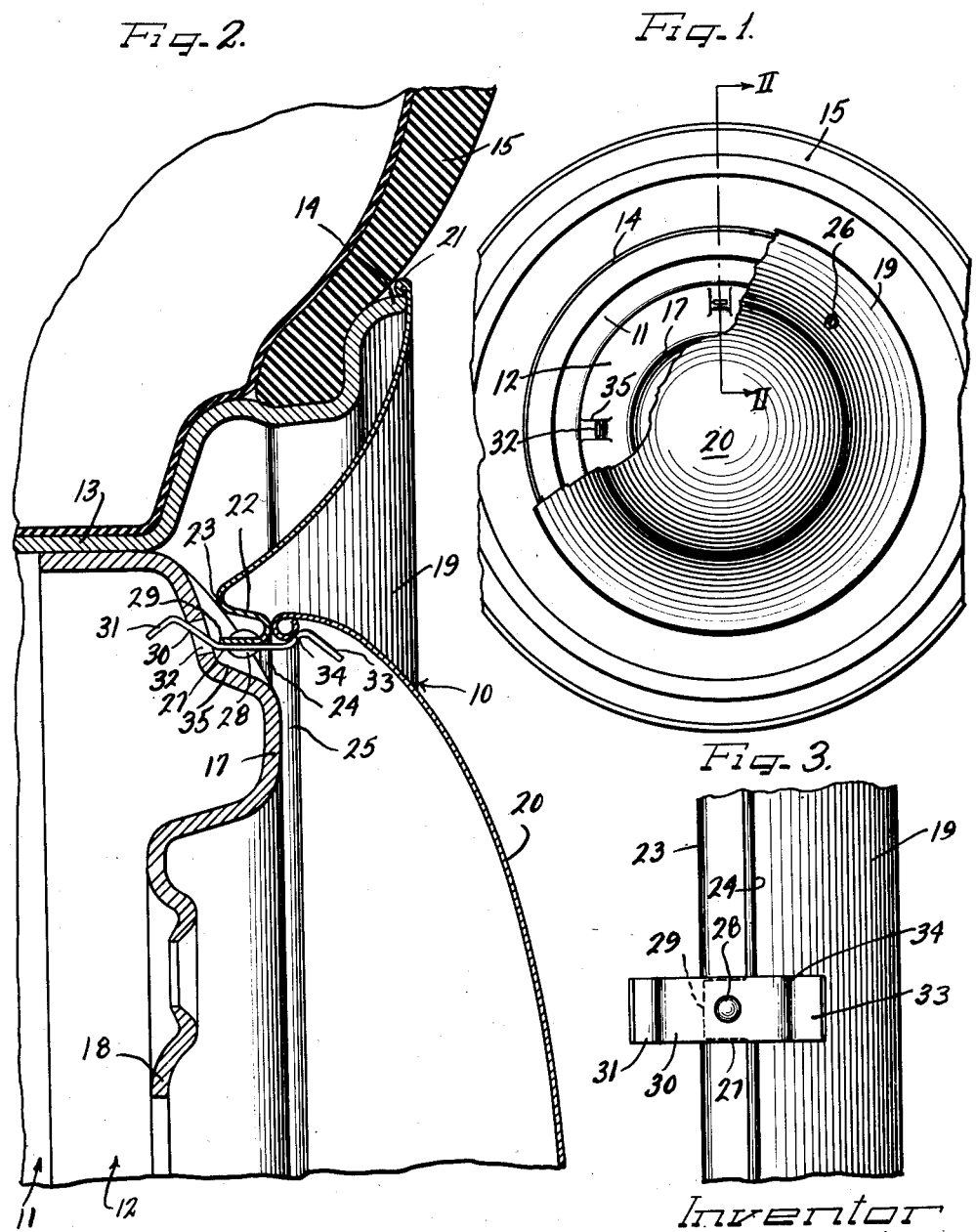

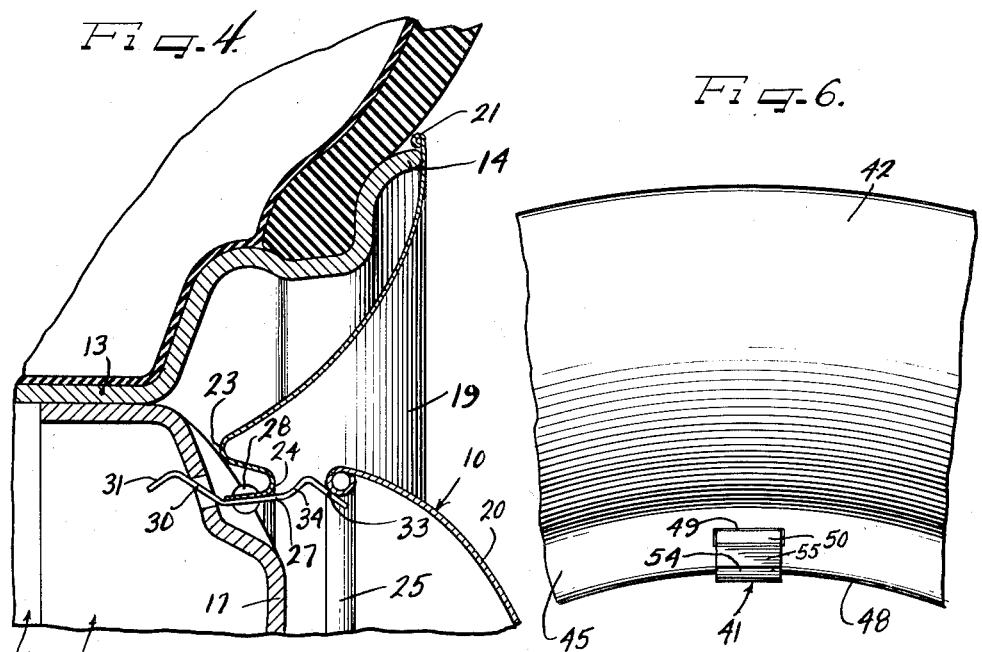
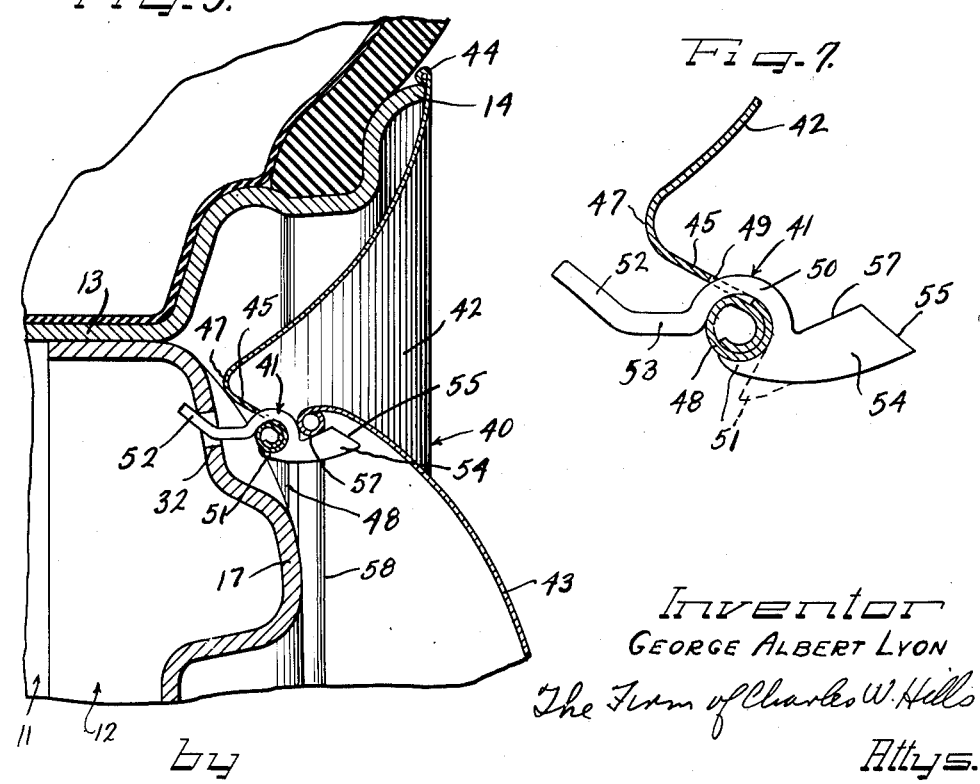

2,629,635

UNITED STATES PATENT OFFICE 2,629,635

WHEEL COVER

George Albert Lyon, Allenhurst, N. J.

Application December 20, 1946, Serial No. 717,351

27 Claims. (Cl. 301—37)

This invention is directed to an improved wheel structure and relates more particularly to a new and improved vehicle wheel and cover assembly therefor.

An important object of this invention is to provide an improved wheel and cover assembly having novel retaining means for maintaining the cover assembly over the outer side of the wheel to conceal the same.

Another object of the invention is to provide a novel cover assembly to be disposed in ornamental covering relation to the outer side of a vehicle wheel and which comprises readily separable components providing a cover that is adapted to be removably mounted upon the wheel.

A further object of the invention is to provide a vehicle wheel cover including separable cover components one of which is adapted to be separably attached to the wheel and the other of which is adapted to be separably attached to the wheel-supported cover component.

Still another object of the invention is to provide in an improved wheel cover assembly novel means for attaching the cover assembly to the wheel.

A still further object of the invention is to provide a cover assembly for a vehicle wheel wherein one component of the cover is adapted to be applied to the wheel independently of another component, whereafter the latter component is adapted to be applied to the wheel-attached component and acts as an interlock to effect substantial locking of the cover against displacement from the wheel.

It is also an object of the invention to provide a complete two-part cover for the outer side of a vehicle wheel, wherein one of the cover parts is supported in a novel, attractive manner by the other cover part.

According to the general features of the invention, there is provided a novel wheel cover assembly including separable component cover members and means for retaining the cover members on a vehicle wheel, such means being operable for preliminarily securing one of the cover components to the wheel and being engageable by the remaining cover component for holding the latter in assembly with the wheel-attached component and coincidentally locking the cover assembly against unintentional displacement from the wheel.

According to other general features of the invention there is provided a cover assembly in which one component carries latching and retaining means thereon for attachment of such component to a wheel structure and for attaching the cover components in assembly, another cover component being removably secured in the assembly by separable engagement with the latching and retaining means, the engagement of the second component with the retaining means acting substantially to lock the retaining means against unintentional release from the wheel.

According to still other general features of the invention, there is provided a vehicle wheel structure which includes a tire rim and a load-sustaining body part wherein the body part has an annular series of equally spaced apertures adjacent to but spaced from the juncture of the body part with the tire rim and a cover is disposed in concealing relation to the outer side of the wheel, the cover comprising an outer annular cover member which is concealingly disposed over the outer side of the tire rim and the juncture of the tire rim and load-sustaining body part and has retaining means formed with respective generally axially inwardly extending portions retainingly engageable within said apertures in the wheel body and also generaly axially outwardly extending portions, a circular inner cover member being retainingly engageable with said axially outwardly extending portions of said retaining means and acting thereon to drive the axially inner retaining portions into substantially locked condition within said apertures to hold the cover against unintentional displacement from the wheel.

According to additional features of the invention one cover component of a composite circular wheel cover assembly is provided at a margin thereof with generally axially extending retaining and latching clips having wheel-engaging portions and portions for receiving and retaining a second cover component, and the second cover component is formed for engagement with the cover receiving and retaining portions of the clips, the clips being movably mounted on the first cover component for deflection into latching position with respect to the wheel when the second cover component is applied thereto.

According to another feature of the invention the retaining and latching clips are constructed as sheet metal strips having cam surfaces and retaining shoulders at opposite ends and being intermediately attached to one of the cover components, with one of their ends engageable with the wheel structure, and the other of their ends engageable with the second of the cover components for retaining the same in assembly with the first cover component.

According to a further feature of the invention, the retaining clips are in the form of elongated latching and clamping members intermediately swivelly mounted at the radially inner margin of one of the cover components and having camming and retaining shoulders at one end for engagement with a wheel structure and camming and retaining shoulders at the opposite end for reception and retention of the second cover component.

According to still other general features of the invention, a cover assembly is provided for use with a wheel structure wherein a tire rim is supported by a load-sustaining body portion, the cover assembly including a trim ring member for concealing disposition with respect to the tire rim and the juncture of the tire rim with the load-sustaining portion and carrying at its inner margin retaining clip members attached thereto at intermediate points thereof for substantially see-saw leverage action adapting the same for primary attachment to the wheel structure through the medium of their axially inner end portions and for retaining, latching action in conjunction with a second cover component which is constructed and arranged for retaining engagement therewith and latching actuation thereof.

As yet another feature of the invention, there is provided, for a wheel having a tire rim and a load-sustaining body, an annular outer cover member formed to substantially conceal the outer side of the tire rim and with the inner margin seated on the wheel body, the inner margin having an axially outwardly extending annular flange, and an inner circular cover member having its radially outer margin formed with a generally axially inwardly extending structure of substantially similar diameter attachable removably to said flange.

Other objects, features and advantages of the present invention will be readily apparent from the following detailed description of certain preferred embodiments of the invention taken in conjunction with the accompanying drawings, wherein:

Fig. 1 is a fragmentary side elevational view of a wheel structure and cover assembly embodying the features of the present invention, with portions of the cover broken away to show certain details of construction;

Fig. 2 is an enlarged radial sectional detail view taken substantially along the line II—II of Fig. 1;

Fig. 3 is a fragmentary elevational view showing a portion of the inner margin of the outer cover member and one of the retaining and latching clips carried thereby;

Fig. 4 is a fragmentary radial sectional view taken substantially in the same plane as Fig. 2, but showing the cover components as they appear in the course of assembly thereof;

Fig. 5 is a radial sectional view taken in substantially the same plane as Fig. 2 but showing a modified form of cover assembly;

Fig. 6 is a fragmentary outer side elevational view of the outer cover or trim ring member of the cover assembly of Fig. 5, and Fig. 7 is a fragmentary sectional detail view on an enlarged scale showing a portion of the inner margin of the outer cover member of Fig. 5 with one of the retaining and latching members and demonstrating how the retaining and latching member is adapted to be assembled with such cover member.

As shown on the drawings:

According to the present invention, having particular reference to Figs. 1 to 4, inclusive, a cover assembly 10 is adapted to be applied in ornamental covering relation to the outer side of a vehicle wheel including a tire rim 11 and a load-sustaining and supporting body part 12.

The tire rim 11 may be of any preferred type, but in the present instance is shown as of the drop center type having a base flange 13 to which the wheel body part 12 is attached in any suitable manner. Integral with the base flange 13 are a plurality of stepped flanges terminating in an outer edge of terminal flange 14 and providing a channel within which is received a tire and tube assembly 15.

The wheel body may be formed as a sheet metal stamping having an axially outwardly bulging intermediate reinforcing nose portion 17 and a central bolt-on flange 18 by which the wheel is adapted to be secured to a part of the axle of a vehicle such as an automobile by means of bolts or cap screws (not shown). Between the stepped flanges of the outer side of the tire rim 11 and the nose portion 17 of the wheel body there is the customary relatively wide and deep groove which results from the particular formation of the wheel component.

The cover assembly 10 is of such construction and arrangement that the outer side of the wheel is entirely concealed and thereby provided with what may be termed a false front which is of substantially more pleasing appearance than the utilitarian angularity of contour of the wheel components and affords smoothly contoured surfaces which are easy to keep clean, in addition, may enhance the appearance of the wheel structure by contrasting decorative finishes of the components of the covers. To these ends, the cover assembly 10 comprises a pair of circular separable cover components 19 and 20 which serve substantially as a trim ring and a hub cap, and are adapted to be assembled in concealing relation to the tire rim 11 and the wheel body 12, respectively. Both the cover members 19 and 20 may be formed from suitable gauge sheet metal, or other appropriate material.

The outer or trim ring cover member 19 is preferably of such radial magnitude as to conceal the outer side of the tire rim 13 in its entirety and also the juncture of the tire rim and the wheel body. Furthermore, in order to enhance the attractiveness of the assembly, the outer trim ring cover member 19 is preferably formed on a generally convex cross sectional contour to extend generally radially inwardly and axially inwardly from the tire rim terminal flange 14 to the wheel body 12 adjacent to but spaced inwardly from the juncture of the tire rim and the wheel body within the groove formed therebetween. Where this curvature is, as shown, in general conformity with the transverse side wall curvature of the tire 15, and is colored generally white, the visual impression is as though the cover member 19 constituted a radially inward white sidewall continuation of the tire side wall.

At its outer margin, the trim ring cover member 19 is preferably formed with a reinforcing and finishing bead 21 dimensioned to encircle the radially outer side of the extremity of the tire rim flange 14 adjacent to the tire side wall. This afford a smooth appearance, substantially concealing the juncture of the tire side wall with the tire rim and fully concealing the edge of the tire rim. In addition, the bead 21 provides a substantial barrier to the influx of dirt behind the cover should there be unevenness in the edge of the tire rim flange 14 or the outer margin of the cover itself which might preclude a tight seating of the inner side of the outer cover margin against the tire rim edge. The bead 21 also assists in maintaining the cover assembly concentric with the wheel.

The inner margin of the trim ring cover member 19 is formed with an outturned, generally axially outwardly and slightly radially inwardly extending annular reinforcing flange 22 which is joined convergently with the body of the cover member on a radius and affords a generally axially inwardly protruding rounded annular shoulder 23 adapted to seat against or at least closely approach the wheel body 12. The juncture groove at the outer side of the cover body and flange convergence is thus also smoothly rounded and minimizes lodging of road dirt therein, and can easily be cleaned.

In addition to affording reinforcement for the inner margin of the trim ring cover member 19, the inner marginal flange 22 serves as structure for mounting or supporting retaining and latching means by which the cover assembly is adapted to be attached to the wheel and also as a seat for the outer margin of the inner hub cap cover member 20. For this purpose, the outer margin of the flange 22 is turned generally radially inwardly and axially inwardly to provide an axially outwardly facing, preferably rounded, seat 24 against which is adapted to be juxtaposed the outer marginal flange of the hub cap member 20 formed with an inwardly curled reinforcing bead 25 of substantially similar outer diameter.

An aperture 26 at an intermediate point in the cover 19 affords clearance for the usual valve stem. Herein the means for retaining and latching the cover on the wheel serves the dual purpose of attaching the cover members 19 and 20 together in assembly. In a simple, convenient and economical form, the retaining means comprises a series of clips 27 which may be in any suitable number, such as four, symmetrically mounted on the flange 22.

The clips 27 comprise elongated metal strips each of which is secured intermediate the ends thereof as by means of a rivet 28 to an axially inwardly extending mounting tab 29 integral with the edge of the seat portion 24 of the outer cover flange. The axially inner end portion of each of the clips 27 is formed with an intermediate radially outwardly biased retaining shoulder portion 30 and radially inwardly biased cam terminal shoulder portion 31.

For retaining the cover assembly upon the wheel the retaining shoulder portion 30 of the clips extend through respective, complementally disposed retaining clip apertures 32 in the wheel body at the radially outer side of the reinforcing nose 17 and engage with the radially outer sides or edges defining the apertures, substantially as shown in Fig. 2. The radially outer extent of the retaining clip shoulder portions 30 is slightly greater than the radially outer bounds of the engaged aperture edges. Hence, in assembling the cover with the wheel, concentric axially inward movement of the cover member 19 causes the cam terminal portions 31 of the clips 27 to enter the respective registering clip apertures 32 and engage the axially outer edges of the radially outer sides of the apertures. Further inward movement of the cover by the application of slight axially inward pressure thereagainst will cause the cam shoulders 31 to cam the clips radially inwardly until the retaining shoulder portions 30 retainingly enter behind and snappingly cam into place against the axially inner aperture edge. As this assembly action occurs, the clips 27 in each instance either flex or move see-saw fashion by flexure of the respective attachment tabs 29 responsive to the leverage exerted thereagainst as the radially outward humps at the junctures of the retaining shoulders 30 and the cam shoulder 31 of the clips snappingly cam past the outer side of the aperture 32.

In order to place the cover member 19 under adequate axial tension to prevent rattling, where the outer margin thereof engages the tire rim flange 14, the cover is preferably so constructed that when being mounted the outer margin engages the edge of the flange 14 before the body-engaging abutment shoulder 23 engages the wheel body. The action of the clips 27 in the initial mounting of the cover 19 is such as to hold the cover member on the wheel, but not necessarily under full tension until the hub cap cover member 20 is applied and engaged by the axially outer end portions of the clips. To this end, the axially outer end portions of each of the clips 27 is formed with a lead-in terminal, generally radially inwardly biased cam portion 33 and an intermediate retaining shoulder portion 34. The latter faces generally axially inwardly and radially outwardly and is in space opposition to seating shoulder 24 a distance normally somewhat less than the diameter of the engaged portion of the hub cap cover marginal bead 25. Thereby, when the hub cap cover member 20 is assembled with the outer cover member 19 by pressing the marginal bead 25 against the cam portions 33 of the clips (Fig. 4) until the bead 25 snaps behind the retaining shoulders 34 of the clips, the outer end portions of the clips are deflected or forced radially inwardly. Hence the clips 27 tend to see-saw about the fulcrum provided by the attachment thereof to the tabs 29, to swing the axially inner retaining shoulder portions 30 thereof outwardly. As a result, the inner retaining shoulder portions 30 cam axially inwardly to their maximum extent and thereby draw the inner marginal cover flange 22 and seating shoulder 23 axially inwardly to their maximum extent. Any additional leverage created by the hub cap bead 25 is absorbed by tensioning of the clips 27 or the tabs 29. At the same time the bead 25 acts as an interlock holding the clips latched strongly against withdrawal from the clip apertures 32, thereby avoiding accidental displacement of the cover assembly from the wheel.

Removal of the hub cap cover member 20 can be conveniently effected by prying the same axially outwardly by means of a pry-off tool inserted between the shoulder 24 and the bead 25. Access to the juncture between the shoulder 24 and the bead 25 is facilitated by the substantial axially outward spacing of the shoulder 24 from the juncture of the flange 22 with the body of the outer cover member 19.

Although it may be possible to apply the cover assembly 10 to the wheel as a unit, the combined flexure tension afforded by the clips 27 and the attachment tabs 29 when the hub cap cover member 20 is in assembly with the trim ring cover member 19 affords such relatively great resistance to radially inward flexure of the retaining shoulder portion 30 of the clip that it will be found more convenient to disassemble the cover members 19 and 20, and first apply the outer cover member 19 to the wheel and thereafter apply the inner cover member 20 to the outer cover member substantially as shown in Fig. 4. The extent of the retaining, latching tension under which the clip 27 and the respective attachment tabs 29 are placed can be substantially visualized by comparison of Figs. 2 and 4.

In order to accommodate the attachment tabs 29 and the body portions of the clips 27, the radially outer side of the nose portion 17 is formed with indentations or pockets 35 at the clip apertures 32. The configuration and formation of the pockets 35 also serves to reinforce the respective areas about the apertures 32 so that the wheel body will not be weakened in the portion thereof where some of the greatest lateral stresses in use are imposed.

In the modified form of the invention as shown in Figs. 5 to 7, inclusive, a similar style of cover assembly 40 is provided but having a different type of retaining and latching clips 41 mounted at the radially inner margin of an outer trim ring cover portion 42 and adapted to retain a central hub cap cover member 43 assembled with the outer cover member. The cover 40 is adapted to be used with the same kind of wheel structure as previously described and similar reference numerals apply to like parts of the wheel.

The outer cover member 42 is preferably of generally convex shape in cross section, having an outer marginal reinforcing and tire rim encircling bead 44, and an inner marginal generally axially outwardly and radially inwardly extending annular reinforcing flange 45 joined to the body of the cover member by a rounded shoulder 47 which is adapted to seat against or at least closely approach the wheel body 12.

The terminal portion of the inner marginal flange 45 is curled to provide a relatively rigid externally rounded bead 48 which for purpose of rigidity preferably comprises more than one turn and as shown may comprise one and a half turns of the material of the cover. At appropriate symmetrically spaced intervals, the flange 45 is formed with apertures 49 closely contiguous the bead 48 for passage therethrough of intermediate arcuate journal portions 50 of the respective retaining and latching clips 41. To facilitate assembly of the clips with the beads 48, the journal portions 50 are formed substantially semi-circular with an integral retention spur 51 forming a continuation of one side of the journal portion originally spread open, as shown in broken outline in Fig. 7, and in the assembly contracted to the diameter of the journal portion and extending to substantially more than 180° around the circumference of the bead 48, as for example, to approximately 240° as shown. In the area adjoining the apertures 49, at least, the bead 48 is formed closely cylindrical so that the journal portions 50 of the respective assembled clips 41 may swivel within the limits thereabout. However, the journal portion 50 is preferably secured through the medium of the spurs 51 with a fairly tight bearing upon the engaged portion of the bead 48 so that free swiveling will be frictionally resisted.

Axially inwardly from the intermediate bearing portion 50, the clip 41 is formed with an elongated retention shoulder portion 52 extending obliquely radially outwardly from a relatively straight axially inward intermediate portion 53. The radially outward angularity of the retaining shoulder portion 52 is such that in mounting the outer trim ring cover portion 42, and with the tips of the retaining shoulder portions 52 of the several clips extending axially inwardly to register with the respective retaining apertures 32 in the wheel body, the radially inner cam surfaces provided by the portions 52 will first engage the radially inner sides of the apertures and in the further axially inward movement of the cover cam the retaining portions 52 generally radially outwardly and axially inwardly behind the radially outer edges of the retaining apertures until the portions 52 are fully inserted within the apertures. In view of the tight bearing engagement of the journal portions 50 with the bearing bead 48, the engagement of the retaining portions 52 of the clips at the back of the wheel body will serve to maintain the trim ring cover portion 42 in place, at least temporarily, or until the hub cap cover portion 43 can be applied.

To receive and retain the hub cap cover portion 43, each of the retaining clips 41 is formed with a generally axially outwardly extending retaining portion or finger 54 which is formed with a terminal lead-in cam surface 55 and inwardly therefrom with a generally radially outwardly and axially inwardly facing retaining shoulder 57. In applying the hub cap cover portion 43, a peripheral reinforcing bead 58 thereof of substantially the same outside diameter as the bead 45 is pressed against the lead-in cam surfaces 55 of the clips 41 and pressure exerted axially inwardly against the hub cap cover until the bead 58 thereof snaps behind the shoulders 57.

The radially outward disposition of the retaining shoulders 57 with respect to the retaining terminal extensions 52 of the respective clips is such that when the hub cap cover bead 58 engages the shoulder 57, it forces the retaining finger portions 54 generally radially inwardly and causes the clips to swing about their swivel axes to the extent permitted by the radially outward camming of the retaining terminal portion 52 in drawing the cover member 42 axially inwardly for firm seating of the shoulder 47 against the wheel body or to place the outer margin of the cover into terminal engagement with the tire rim edge.

The leverage exerted against the clips 41 by the bead 58 of the hub cap cover member 43 places the clips and at least the contiguous portions of the inner marginal cover reinforcing flange 45 under resilient tension whereby the clips 41 latchingly maintain their retaining grip upon the wheel body and upon the interlocking hub cap cover bead 58 and effectually resist unintentional displacement of the cover assembly.

To remove the hub cap cover portion 43 it may be simply pried free from the retaining clips 41 by inserting a pry-off tool between the bearing bead 48 of the outer cover member and the reinforcing, attachment and interlock bead 58 of the hub cap member. Thereupon, if desired, the outer cover member 42 may also be removed simply by drawing it axially outwardly whereupon the retaining portions 52 of the clips 41 will be released from engagement with the wheel body by camming out of the respective retaining apertures 32.

In both forms of the invention disclosed, the hub cap inner cover member may be formed from stainless steel and polished to afford an attractive appearance in contrast with the trim ring cover member, or the hub cap cover member may be made from any other suitable material, colored, painted or polished to suit any particular preference. In both instances, a certain degree of flexibility in the hub cap cover margin is desirable supplementary to the resilience of the retaining means.

The neat, symmetrical appearance of the cover assembly is substantially enhanced by the freedom from visible joints, since the single joint between the inner edge of the hub cap cover member and the opposing edge of the inner marginal flange of the outer cover member is effectively concealed by the hub cap margin.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A vehicle wheel structure including a tire rim and a load-sustaining body part, the body part having an annular series of equally spaced apertures adjacent to but spaced from the juncture of the body part with the tire rim, and a cover disposed in concealing relation to the outer side of the wheel, the cover comprising an outer annular cover member concealingly disposed over the outer side of the tire rim and the juncture of the tire rim and load-sustaining body part and having retaining means comprising respective generally axially inwardly extending portions retainingly engageable within said apertures in the wheel body and also generally axially outwardly extending portions, the portions of said retaining means being movable relative to the body of the outer cover member and being so related to each other that predetermined movement of the outer portions cause predetermined movement reaction of the inner portions toward substantially locked relation to the wheel body part within said apertures, and a circular inner cover member retainingly engageable with said axially outwardly extending portions of said retaining means and acting thereon to cause said predetermined movement of the outer portions and thus the predetermined movement of the inner retaining portions into the substantially locked condition within said apertures to hold the cover against unintentional displacement from the wheel.

2. In a wheel structure including a tire rim and a load-sustaining body part wherein the body part has a series of retaining apertures adjacent to the juncture thereof with the tire rim, a trim ring cover member having a shape generally simulating a radially inward extension of a tire side wall and formed with an inner marginal generally axially inwardly facing shoulder opposing the wheel body and a generally axially outwardly extending inner marginal flange projecting from said shoulder, a hub cap simulating inner cover member having its margin dimensioned to be disposed substantially conterminous with said inner marginal flange, and spaced from the juncture of said inner marginal flange and the body of the outer cover member by at least the width of said flange, and clip members carried by said inner marginal flange and having portions engaging within said apertures for retaining the cover assembly on the wheel and portions for engaging the margin of the inner cover member for retaining it in assembly with the outer cover member, the spacing of the inner cover margin from the body of the outer cover member facilitating the insertion of a pry-off tool between the inner cover margin and said inner marginal flange.

3. In a composite cover assembly, one cover component provided at a margin thereof with generally axially extending retaining and latching clips having wheel engaging portions and portions for receiving and retaining a second cover component, and a second cover component formed for engagement with the cover receiving and retaining portions of the clips, said clips being movably mounted on said one cover component for deflection of the wheel engaging portions into latching position with respect to the wheel when the second cover component is applied in retained relation to the receiving and retaining portions.

4. In a composite cover assembly, one cover component provided at a margin thereof with generally axially extending retaining and latching clips having wheel-engaging portions and portions for receiving and retaining a second cover component, and a second cover component formed for engagement with the cover receiving and retaining portions of the clips, said clips being movably mounted on said one cover component for deflection into latching position with respect to the wheel when the second cover component is applied thereto, the retaining and latching clips being constructed as sheet metal strips having cam surfaces and retaining shoulders at opposite ends and being intermediately attached to said one cover component, with one of their ends comprising the wheel-engaging portions, and their other ends comprising the cover receiving and retaining portions of the clips.

5. In a composite cover assembly, one cover component provided at a margin thereof with generally axially extending retaining and latching clips having wheel-engaging portions and portions for receiving and retaining a second cover component, and a second cover component formed for engagement with the cover receiving and retaining portions of the clips, said clips being movably mounted on said one cover component for deflection into latching position with respect to the wheel when the second cover component is applied thereto, the retaining clips being in the form of elongated latching and clamping members intermediately swivelly mounted at the radially inner margin of said one cover component and having camming and retaining shoulders at the ends thereof forming their wheel-engaging portions and camming and retaining shoulders at their opposite ends forming the portions for receiving and retaining the second cover component.

6. A cover assembly for use with a wheel structure wherein a tire rim is supported by a load-sustaining body portion, the cover assembly including a trim ring member for concealing disposition with respect to the tire rim and the juncture of a tire rim with the load-sustaining portion, said member carrying at its inner margin retaining clip members attached thereto at intermediate points thereof for substantially seesaw leverage action adapting the same for primary attachment to the wheel structure through the medium of their axially inner end portions and for retaining, latching action in conjunction with a second cover component, and a second cover component constructed and arranged for retaining engagement with and latching actuation of the clip members.

7. In combination in a cover assembly for concealing disposition with respect to the outer side of a vehicle wheel, an outer cover annulus having retaining clips mounted upon the inner marginal portion thereof, said clips having axially inwardly and axially outwardly extending portions, the axially inwardly extending portions of the clips being engageable with a portion of the wheel and the axially outwardly extending portions having retention shoulders facing generally axially inwardly and radially outwardly, and an inner circular cover member having a beaded edge engageable in snap-on pry-off relation with said axially outer retaining shoulder portions.

8. In combination in a cover assembly for concealing disposition with respect to the outer side of a vehicle wheel, an outer cover annulus having retaining clips mounted upon the inner marginal portion thereof, said clips having axially inwardly and axially outwardly extending portions, the axially inwardly extending portions of the clips being engageable with a portion of the wheel and the axially outwardly extending portions having retention shoulders facing generally axially inwardly and radially outwardly, and an inner circular cover member having a beaded edge engageable in snap-on pry-off relation with said axially outer retaining shoulder portions, said clips comprising sheet metal strips having the outer portions thereof bent to provide said retaining shoulders.

9. In combination in a cover assembly for concealing disposition with respect to the outer side of a vehicle wheel, an outer cover annulus having retaining clips mounted upon the inner marginal portion thereof, said clips having axially inwardly and axially outwardly extending portions, the axially inwardly extending portions of the clips being engageable with a portion of the wheel and the axially outwardly extending portions having retention shoulders facing generally axially inwardly and radially outwardly, and an inner circular cover member having a beaded edge engageable in snap-on pry-off relation with said axially outer retaining shoulder portions, said clips comprising sheet metal strips having the outer portions thereof bent to provide said retaining shoulders, said clips comprising swivel members and having the axially outer portions thereof formed as relatively rigid retaining fingers.

10. In combination in a cover assembly of the character described, an outer cover annulus having the inner margin thereof formed with an axially outwardly extending flange turned over radially inwardly and axially inwardly and having a symmetrically disposed series of axially inwardly extending attachment tabs, retaining clips formed from respective strips of sheet metal and secured at intermediate points thereof to said attachment tabs, each of said clips having an axially inwardly extending attachment portion adapted to engage retainingly with a portion of a wheel upon which the cover assembly is mounted, each of said clips having a generally axially outwardly extending portion formed with a lead-in cam terminal portion and a retaining shoulder facing generally radially outwardly and axially inwardly, and an inner circular cover member having a marginal bead engageable with the retaining shoulders of the outwardly extending portions of the clips and being dimensioned to draw said retaining portions of the clips generally radially inwardly and flex said attachment tabs.

11. In combination in a cover assembly of the character described, an outer cover annulus having the inner margin thereof formed with an axially outwardly extending flange turned over radially inwardly and axially inwardly and having a symmetrically disposed series of axially inwardly extending attachment tabs, retaining clips formed from respective strips of sheet metal and secured at intermediate points thereof to said attachment tabs, each of said clips having an axially inwardly extending attachment portion adapted to engage retainingly with a portion of a wheel upon which the cover assembly is mounted, each of said clips having a generally axially outwardly extending portion formed with a lead-in cam terminal portion and a retaining shoulder facing generally radially outwardly and axially inwardly, and an inner circular cover member having a marginal bead engageable with the retaining shoulders of the outwardly extending portions of the clips and being dimensioned to draw said retaining portions of the clips generally radially inwardly and flex said attachment tabs, said clips being of resilient structure but more rigid than said attachment tabs.

12. In combination in a cover assembly including a radially outer trim ring cover member and an inner circular cover member with the inner margin of the trim ring cover member substantially opposed to the margin of the inner cover member, the inner margin of the outer cover member being formed with bearing means, and retaining clips pivotally mounted on said bearing means and having portions thereof for engaging the margin of the inner cover member for holding the same in assembly with the outer cover member and also portions for retaining engagement with a portion of a wheel structure for holding the cover assembly mounted on the wheel structure.

13. In combination in a cover assembly including a radially outer trim ring cover member and an inner circular cover member with the inner margin of the trim ring cover member substantially opposed to the margin of the inner cover member, the inner margin of the outer cover member being formed with bearing means, and retaining clips pivotally mounted on said bearing means and having portions thereof for engaging the margin of the inner cover member for holding the same in assembly with the outer cover member and also portions for retaining engagement with a portion of a wheel structure for holding the cover assembly mounted on the wheel structure, the clips engaging said bearing means in tight bearing relation so as to avoid free swiveling thereof but permitting forceful pivotal movement.

14. In combination in a cover assembly including a radially outer trim ring cover member and an inner circular cover member with the inner margin of the trim ring cover member substantially opposed to the margin of the inner cover member, the inner margin of the outer cover member being formed with bearing means, and retaining clips pivotally mounted on said bearing means and having portions thereof for engaging the margin of the inner cover member for holding the same in assembly with the outer cover member and also portions for retaining engagement with a portion of a wheel structure for holding the cover assembly mounted on the wheel structure, the clips engaging said bearing means in tight bearing relation so as to avoid free swiveling thereof but permitting forceful pivotal movement, the clip members being formed with intermediate journal portions engaging said bearing means and the retaining portions of the clips comprising oppositely extending relatively rigid fingers.

15. In a cover assembly adapted to be placed in covering relation to the outer side of a vehicle wheel, an outer annular cover member having the inner margin thereof formed as a generally axially outwardly extending annular flange, an inner circular cover member having the margin thereof formed to lie substantially opposed to said flange, and means carried by said flange for retaining said inner cover member assembled with the outer cover member and for retaining the cover assembly on the wheel, said retaining means comprising elongated clip members intermediately attached to said inner marginal flange and having axially inwardly extending portions for engagement with the wheel and axially outwardly extending portions for engagement of the inner cover margin and being adapted for seesaw leverage action adapting them for application to the wheel and for receiving the inner cover member in assembly with the outer cover member.

16. In a cover assembly adapted to be placed in covering relation to the outer side of a vehicle wheel, an outer annular cover member having the inner margin thereof formed as a generally axially outwardly extending annular flange, an inner circular cover member having the margin thereof formed to lie substantially opposed to said flange, and means carried by said flange for retaining said inner cover member assembled with the outer cover member and for retaining the cover assembly on the wheel, said retaining means comprising elongated clip members intermediately attached to said inner marginal flange and having axially inwardly extending portions for engagement with the wheel and axially outwardly extending portions for engagement of the inner cover margin and being adapted for seesaw leverage action adapting them for application to the wheel and for receiving the inner cover member in assembly with the outer cover member, said inner marginal flange having a rounded shoulder opposing the margin of the inner cover member, and the inner cover member having the margin thereof formed into a bead.

17. In a wheel structure including a tire rim and a wheel body, a cover assembly for ornamentally concealing the outer side of the wheel comprising a radially outer annular member for substantially concealing the tire rim, an inner circular cover member in the nature of a hub cap, and retaining means engageable with the wheel structure and retaining the outer annular cover member relatively fixedly assembled on the wheel but retaining the inner hub cap cover member separably so that the inner hub cap cover member can be readily pried free from the assembly and replaced at will, said retaining means comprising a series of circularly spaced one-piece combination wheel-engaging fingers and cover-engaging spring clips, the annular outer cover member having an inner marginal flange secured in place with respect to an intermediate portion of each of the retaining means and the inner hub cap cover member having a marginal formation engaging in snap-on pry-off relationship with the spring clip portions of the retaining means.

18. In a wheel structure including a tire rim and a wheel body, a cover assembly for ornamentally concealing the outer side of the wheel comprising a radially outer annular member for substantially concealing the tire rim, an inner circular cover member in the nature of a hub cap, and retaining means engageable with the wheel structure and retaining the outer annular cover member relatively fixedly assembled on the wheel but retaining the inner hub cap cover member separably so that the inner hub cap cover member can be readily pried free from the assembly and replaced at will, said retaining means being in the form of clip members each of which has an inner portion retainingly engageable with the wheel and an outer portion retainingly engageable by the inner hub cap cover member in separable relationship, the outer annular cover member being formed at its inner margin with a flange secured to an intermediate portion of the retaining clip members.

19. In a wheel structure including a tire rim and a wheel body, a cover assembly for ornamentally concealing the outer side of the wheel comprising a radially outer annular member for substantially concealing the tire rim, an inner circular cover member in the nature of a hub cap, and retaining means engageable with the wheel structure and retaining the outer annular cover member relatively fixedly assembled on the wheel but retaining the inner hub cap cover member separably so that the inner hub cap cover member can be readily pried free from the assembly and replaced at will, the retaining means being in the form of elongated clips having inner wheel-engaging portions and outer spring clip portions engageable with the inner cover member, the outer cover member being formed with an inner marginal return bent flange formation interengaged with intermediate portions of the respective retaining clips.

20. For use with a vehicle wheel including a tire rim and a wheel body, a cover assembly including an annular trim ring member for substantially concealing the tire rim and having an arcuate cross-sectional formation generally simulative of the curvature of the side wall of a tire mounted in the rim and adapted to be of light color so as to be simulative of an inner white sidewall extension on the tire, a central hub cap-like cover member cooperative with the inner marginal portion of the trim ring cover member to afford a complete cover for the wheel, and retaining clips carried by the inner marginal portion of the trim ring cover member and adapted for cover retaining engagement with the wheel and having spring clip portions thereon for separable retention of the hub cap-like cover member.

21. In a cover assembly for a wheel including a time rim part and a load sustaining body part, a trim ring cover member, a hub cap cover member, and a series of individual retaining clips separably connecting the cover members and having portions thereof concealed by the cover members and engaging one of said wheel parts for retaining the cover on the wheel, one of said cover members having respective apertures at engagement with the clips and the clips having means thereon extending through said apertures and connecting the clips and said one cover member together.

22. In a cover assembly for a vehicle wheel including a tire rim and a body part, a trim ring member for concealing the tire rim, a hub cap member of a diameter to cooperate with the margin of the trim ring portion for concealing the central part of the wheel body, and clips carried by the inner margin of the trim ring member and having generally axially outwardly extending spring latch portions engageable in snap-on pry-off relation by the marginal portion of the hub cap member, said clips having generally axially inwardly extending portions engageable with the wheel for retaining the cover in place thereon.

23. In a cover for disposition at the outer side of a vehicle wheel, a circular cover member having opposite faces and a clip-supporting margin, and clip means at said margin of the cover member comprising respective clip portions extending in one axial direction angularly to and beyond one face of the cover for retaining engagement with a wheel and respective clip portions extending in the opposite axial direction angularly to and beyond the opposite face of the cover for retaining engagement with a second cover member to retain the same in place on said circular cover member.

24. In a cover assembly for the outer side of a vehicle wheel, a circular cover member, and retaining clip means carried by the cover member and including a retaining portion for engagement by another cover member to retain the same in assembly with one side of the first mentioned cover member, and a portion extending from the clip means to the opposite side of the first cover member and arranged for retaining engagement with the wheel to which the cover is applied.

25. In a cover assembly for disposition at the outer side of a vehicle wheel, a trim ring annulus having retaining clip means mounted on the radially inner portion thereof and said clip means including a cover retaining portion at one face of the trim ring and a wheel engaging portion at the opposite face of the trim ring, and a hub cap cover member engaging the cover retaining portion of the retaining clip means and arranged to place the wheel engaging portion of the retaining clip means under substantially interlocking leverage with respect to the wheel.

26. In a wheel structure including a tire rim and a body member wherein the body member has retaining clip openings therein spaced radially inwardly from the juncture of the body with the tire rim, a wheel cover assembly including a trim ring portion having retaining clips thereon mounted on the axially outer side thereof and extending therethrough into retaining engagement within said clip openings in the wheel body, and a hub cap member engaging the axially outer portions of the retaining clips and placing the same under latching tension.

27. In a wheel structure including tire rim and body parts, a cover assembly for disposition at the outer side of the wheel comprising a trim ring member for substantially concealing the tire rim and the adjacent portion of the wheel body and having a radially inner portion opposite the wheel body, retaining clips mounted on said radially inner portion of the trim ring member and having a formation including a retaining shoulder lever flange extending generally axially inwardly, the trim ring member having an aperture for clearing the lever flange therethrough, the wheel body having a retaining aperture therein for receiving the axially inner end of the retaining lever flange of the clip, a hub cap member secured in assembly by engagement with the axially outer end portion of the lever flange of the clip and maintaining the lever flange under tension leverage in engagement with the wheel body.

GEORGE ALBERT LYON.

REFERENCES CITED

The following references are of record in the file of this patent:

UNITED STATES PATENTS

| Number | Name | Date |
|---|---|---|
| D. 141,497 | Lyon | June 5, 1945 |
| 2,202,102 | Horn | May 28, 1940 |
| 2,264,946 | Lyon | Dec. 2, 1941 |
| 2,326,788 | Lyon | Aug. 17, 1943 |
| 2,386,244 | Lyon | Oct. 9, 1945 |